United States Patent
Sugita (10) Patent No.: US 6,570,935 B1
(45) Date of Patent: May 27, 2003

(54) METHOD AND SYSTEM FOR DEMODULATING A RECEIVE SIGNAL INCLUDING A PILOT SIGNAL

(75) Inventor: Naohiko Sugita, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/317,261

(22) Filed: May 24, 1999

(30) Foreign Application Priority Data

May 28, 1998 (JP) .......................................... 10-146865

(51) Int. Cl.[7] .............................................. H04L 27/16
(52) U.S. Cl. ........................ 375/324; 375/340; 375/366; 370/324; 370/511; 370/513; 370/514; 455/52.1; 455/52.3
(58) Field of Search ................................. 375/260, 324, 375/325, 340, 365, 366; 370/321, 324, 347, 510, 511, 513, 514; 455/50.1, 521–523, 63

(56) References Cited

U.S. PATENT DOCUMENTS

| | | | | |
|---|---|---|---|---|
| 5,414,734 A | * | 5/1995 | Marchetto et al. | 375/267 |
| 5,596,608 A | * | 1/1997 | Sassa et al. | 375/346 |
| 5,732,107 A | * | 3/1998 | Phillips et al. | 375/229 |
| 5,901,185 A | * | 5/1999 | Hassan | 370/522 |
| 6,085,103 A | * | 7/2000 | Ramesh et al. | 375/346 |

FOREIGN PATENT DOCUMENTS

| | | |
|---|---|---|
| JP | 6-30057 | 2/1994 |
| JP | 6-326624 | 11/1994 |
| JP | 9-102806 | 4/1997 |
| JP | 9-181693 | 7/1997 |
| JP | 11-220503 | 8/1999 |
| WO | WO 95/35615 | 12/1995 |

OTHER PUBLICATIONS

Meyr, "Digital Communication Receiver", John Wiley & Sons, (1997), pp. 744–747.
M. Sanpei, "16QAM Fading Distortion Compensation Method for Land Mobile Communication", IEICE Paper Publication B–11, vol. J72–B–11, No. 1, (1989), pp. 7–15,.

* cited by examiner

Primary Examiner—Stephen Chin
Assistant Examiner—Dac V. Ha
(74) Attorney, Agent, or Firm—Sughrue Mion, PLLC (57) ABSTRACT

In this demodulation method, a receive signal is demodulated estimating the fading distortion of data by detecting the fading distortion of unique word as pilot signal inserted into multiple sections of the receive signal. The method has the steps of: comparing a unique word in the multiple sections of receive signal and a known unique word and thereby detecting the fading distortion of unique word in the multiple sections; calculating a spline interpolation curve based on the fading distortion of unique word in the multiple sections; estimating the fading distortion of data in the receive signal from the spline interpolation curve; and demodulating the data in the receive signal based on the fading distortion of the data.

29 Claims, 7 Drawing Sheets

METHOD AND SYSTEM FOR DEMODULATING A RECEIVE SIGNAL INCLUDING A PILOT SIGNAL

FIELD OF THE INVENTION

This invention relates to a method and a system for demodulating receive signal including pilot signal, and more particularly to, a method and a system for demodulating receive signal including pilot signal while suppressing BER (bit error rate) on the basis of unique word as pilot signal in mobile satellite communication incurring a fast fading on transmission path.

BACKGROUND OF THE INVENTION

Figure 1:
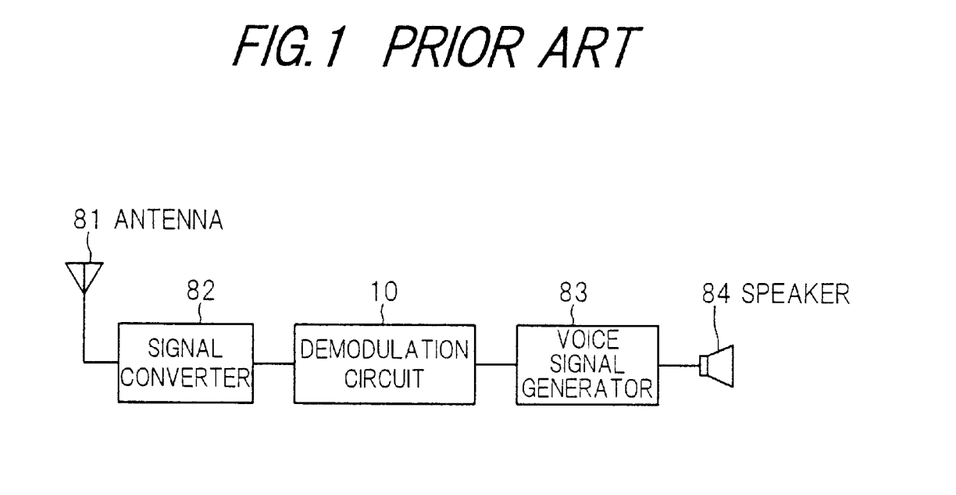
FIG. 1 is a block diagram showing the conventional mobile terminal for mobile satellite communication.

FIG. 1 shows a mobile terminal for mobile satellite communication. This mobile terminal, for example, a portable telephone, is composed of an antenna 81 to receive a transmit signal with a pilot signal in multiple blocks through a satellite, a signal converter 82 to convert the received signal from analogue to digital, a demodulation circuit 10 to demodulate the converted signal, a voice signal generator to convert the demodulated signal from digital to analogue, and a speaker 84 to output a voice signal.

In FIG. 1, a receive signal including a pilot signal received by the antenna 81 is converted into a digital signal. The converted digital signal is demodulated by the demodulation circuit 10, and then converted into an analogue voice signal by the voice signal generator 83. The analogue voice signal converted by the voice signal generator 83 is output as voice sound from the speaker 84.

In the above satellite communication system, for the purpose of reducing required power or miniaturizing the antenna, further for the purpose of keeping BER low even under the condition with a low signal-to-noise power ratio, an error correction code with large encoding gain or a high-efficiency encoding technique is used.

Figure 2:
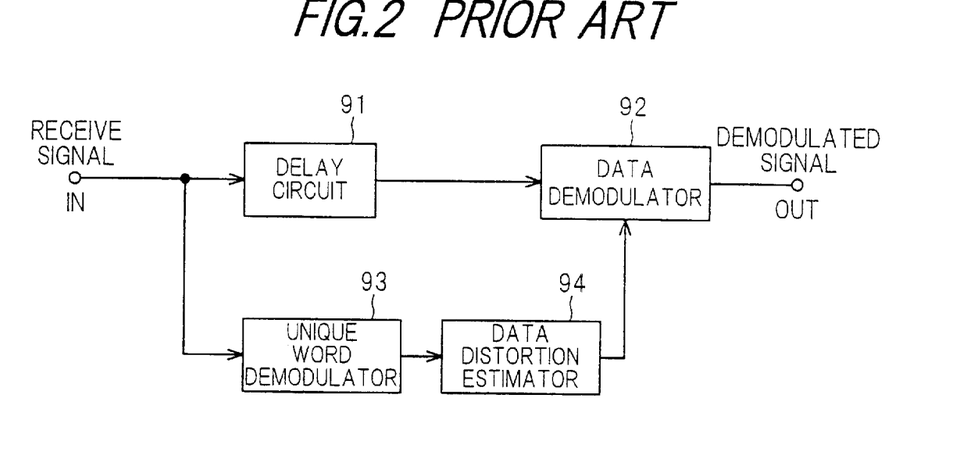
FIG. 2 is a block diagram showing the conventional demodulation system.

FIG. 2 shows a demodulation system for continuous wave, which is described in Meyr, "Digital Communication Receiver", John Wiley &Sons, pp.744–747, 1997, that can be used as the demodulation circuit 10 in FIG. 1. In this system, for a multipath fading including frequency-selective fading and flat fading with no frequency characteristic, receive signals are demodulated compensating a distortion in receive signal on flat fading (hereinafter simply referred to as 'fading distortion').

In FIG. 2, a continuous-wave receive signal with unique words as pilot signal inserted at given intervals is input to an input terminal IN, and then supplied to a delay circuit 91 and a unique word demodulator 93. A unique word in the receive signal is demodulated by the unique word demodulator 93, input to a data distortion estimator 94 composed of a Wiener filter. The data distortion estimator 94 estimates the fading distortion of data in the receive signal based on the fading distortion of unique word calculated from known values (e.g., 0 that +1 is phase-modulated, and π that −1 is phase-modulated) and the value of the demodulated unique word, then outputting it to a data demodulator 92. The data demodulator 92 demodulates data delayed a given time by the delay circuit 91 while compensating it with the estimation quantity of fading distortion, then outputting a demodulated signal from an output terminal OUT. Thus, data transmitted on continuous wave can be demodulated with the fading distortion compensated.

Figure 3:
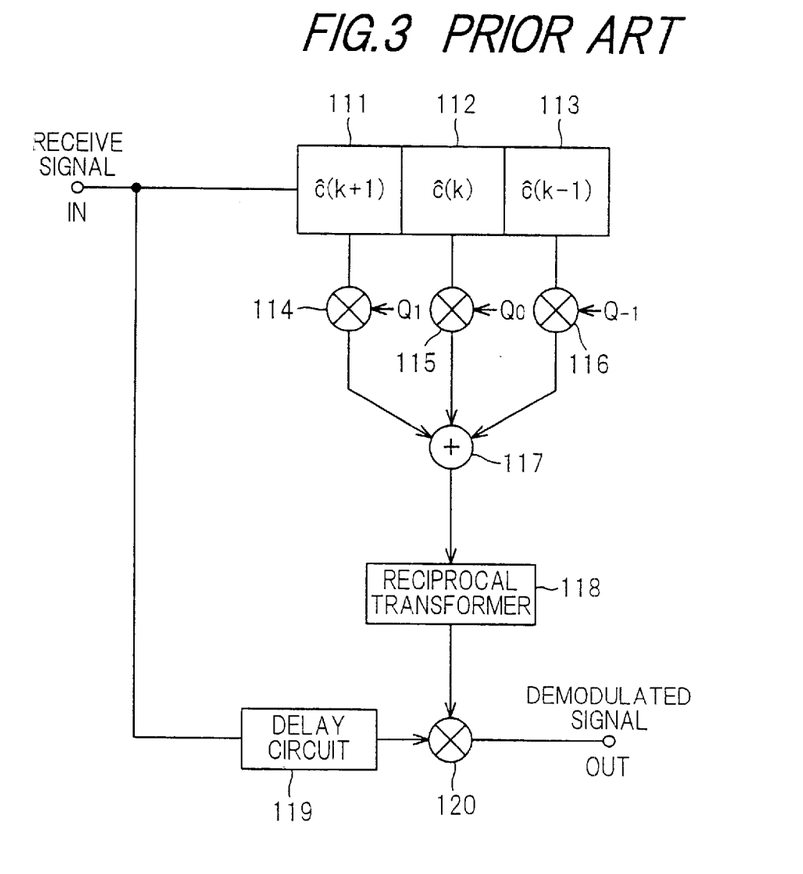
FIG. 3 is a block diagram showing the other conventional demodulation system.

FIG. 3 shows another demodulation system, which is described in M. Sanpei, "16QAM Fading Distortion Compensation Method for Land Mobile communication", IEICE Paper Publication B-11, Vol. J72-B-11, No. 1, pp. 7–15, 1989, that can be used as the demodulation circuit 10 in FIG. 1. This system demodulates compensating the fading distortion of a continuous receive signal with one unique word symbol inserted for every (N−1) information symbols. In FIG.3, when a receive signal is input to an input terminal IN, fading distortion estimators 111, 112 and 113 calculate the fading distortion estimate values $c(k-1)$, $c(k)$ and $c(k+1)$ of (k−1)th, k-th and (k+1)th unique words in the receive signal that are delayed in the sequence. The estimate values are multiplied with $0^{th}$-order or $1^{st}$-order interpolation coefficients by multipliers 114, 115 and 116, and added by an adder 117. The adder 117 outputs $c\{k+(m/N)\}$ as the fading distortion of m-th information symbol in k-th information symbol sequence, as the addition result. The fading distortion of this information symbol is transformed into $1/c\{k+(m/N)\}$ by a reciprocal transformer 118, then output to a multiplier 120. The multiplier 120 multiplies information symbol in the receive signal delayed by a delay circuit 119 by $1/c\{k+(m/N)\}$ output from the reciprocal transformer 118 to demodulate its information, which is output from a output terminal OUT. Thus, the receive signal is demodulated compensating the envelope curve and phase of the receive signal distorted by fading distortion.

However, the demodulation system in FIG. 12 has a problem described below. It can demodulate the receive signal at a desired BER for continuous wave that unique words are inserted at given intervals to continuous data. But, for example, when receiving a burst signal with frame format that unique words are inserted to the several parts of a 100 to 150 symbol data sequence, since the fading distortion of data sequence at both ends is estimated from the fading distortion of unique word at one side, the estimation precision of fading distortion of data located at the opposite side of the unique word is reduced. Therefore, under the condition with fast fading or low C/N ratio, a desired BER, e.g., such a BER that corresponds to a deterioration 0.5 dB of from theoretical value when the Rician fading intensity is 0 dB and the Doppler frequency is 0.01%, cannot be obtained. If instead of the Wiener filter, a Kalman filter or MAP estimation with a higher estimation precision is used, since it is such a matrix-like technique that requires a large amount of operation, the amount of operation increases.

For the demodulation system in FIG. 3, when it uses a $0^{th}$-order interpolation coefficient, one unique word value is retained over the corresponding (N−1) information symbols. Also, when it uses a $1^{th}$-order interpolation coefficient, the fading distortion of information symbol is estimated by connecting between adjacent unique words with a straight line. Therefore, under the condition with fast fading or low C/N ratio, a desired BER cannot be obtained.

SUMMARY OF THE INVENTION

Accordingly, it is an object of the invention to provide a method and a system for demodulating receive signal including pilot signal that even when fast fading occurs on the channel, the fading distortion can be estimated at a high precision and a low BER can be obtained, without increasing the amount of operation.

It is a further object of the invention to provide a method and a system for demodulating receive signal including pilot signal that in receiving a burst signal, a low BER can be obtained compensating the fast fading.

According to the invention, a method for demodulating receive signal including pilot signal that a receive signal is demodulated estimating the fading distortion of data by detecting the fading distortion of unique word as pilot signal inserted into multiple sections of the receive signal, comprises the steps of:

comparing a unique word in the multiple sections of receive signal and a known unique word and thereby detecting the fading distortion of unique word in the multiple sections;

calculating a spline interpolation curve based on the fading distortion of unique word in the multiple sections;

estimating the fading distortion of data in the receive signal from the spline interpolation curve; and demodulating the data in the receive signal based on the fading distortion of the data.

According to another aspect of the invention, a method for demodulating receive signal including pilot signal that a receive signal is demodulated estimating the fading distortion of data by detecting the fading distortion of unique word as pilot signal inserted into multiple sections of the receive signal, comprises the steps of:

comparing a unique word in the multiple sections of receive signal and a known unique word and thereby detecting the fading distortion of unique word in the multiple sections;

calculating a spline interpolation curve based on the fading distortion of unique word in the multiple sections;

estimating the first fading distortion of data in the receive signal from the spline interpolation curve;

estimating the second fading distortion of data in the receive signal by inputting the fading distortion of unique word in the multiple sections to a Wiener filter; and demodulating the data in the receive signal based on the first and second fading distortions of the data.

According to another aspect of the invention, a method for demodulating receive signal including pilot signal that a receive signal is demodulated estimating the fading distortion of data by detecting the fading distortion of unique word as pilot signal inserted into multiple sections of the receive signal, comprises the steps of:

comparing a unique word in the multiple sections of receive signal and a known unique word and thereby detecting the first-stage fading distortion of unique word in the multiple sections;

calculating a first-stage spline interpolation curve based on the first-stage fading distortion of unique word in the multiple sections;

estimating the-first-stage fading distortion of data in the receive signal from the first-stage spline interpolation curve;

demodulating the receive signal based on the first-stage fading distortion of data in the receive signal and then outputting a demodulated signal;

comparing the demodulated signal with a predetermined threshold value and thereby outputting a binary signal;

comparing a unique word in the multiple sections of receive signal and a known unique word and thereby detecting the second-stage fading distortion of unique word in the multiple sections;

comparing data adjacent to unique word in the multiple sections with the binary signal and thereby detecting the fading distortion of adjacent data;

calculating a second-stage spline interpolation curve based on the average of the second-stage fading distortion of unique word in the multiple sections and the fading distortion of adjacent data;

estimating the second-stage first fading distortion of data in the receive signal from the second-stage spline interpolation curve;

estimating the second-stage second fading distortion of data in the receive signal by inputting the average of the second-stage fading distortion of unique word in the multiple sections and the fading distortion of adjacent data to a Wiener filter; and demodulating the data in the receive signal based on the second-stage first and second fading distortions of the data.

According to another aspect of the invention, a system for demodulating receive signal including pilot signal that a receive signal is demodulated estimating the fading distortion of data by detecting the fading distortion of unique word as pilot signal inserted into multiple sections of the receive signal, comprises:

detection means for comparing a unique word in the multiple sections of receive signal and a known unique word and thereby detecting the fading distortion of unique word in the multiple sections;

spline interpolation estimation means for calculating a spline interpolation curve based on the fading distortion of unique word in the multiple sections, and estimating the fading distortion of data in the receive signal from the spline interpolation curve; and demodulation means for demodulating the data in the receive signal based on the fading distortion of the data.

According to another aspect of the invention, a system for demodulating receive signal including pilot signal that a receive signal is demodulated estimating the fading distortion of data by detecting the fading distortion of unique word as pilot signal inserted into multiple sections of the receive signal, comprises:

detection means for comparing a unique word in the multiple sections of receive signal and a known unique word and thereby detecting the fading distortion of unique word in the multiple sections;

spline interpolation estimation means for calculating a spline interpolation curve based on the fading distortion of unique word in the multiple sections, and estimating the first fading distortion of data in the receive signal from the spline interpolation curve;

Wiener filter means for estimating the second fading distortion of data in the receive signal from the fading distortion of unique word in the multiple sections; and demodulation means for demodulating the data in the receive signal based on the first and second fading distortions of the data.

According to another aspect of the invention, a system for demodulating receive signal including pilot signal that a receive signal is demodulated estimating the fading distortion of data by detecting the fading distortion of unique word as pilot signal inserted into multiple sections of the receive signal, comprises:

first detection means for comparing a unique word in the multiple sections of receive signal and a known unique word and thereby detecting the first-stage fading distortion of unique word in the multiple sections;

spline interpolation estimation means for calculating a first-stage spline interpolation curve based on the first-stage fading distortion of unique word in the multiple sections, estimating the first-stage fading distortion of data in the receive signal from the first-stage spline interpolation curve;

first demodulation means for demodulating the receive signal based on the first-stage fading distortion of data in the receive signal and then outputting a demodulated signal;

decision means for comparing the demodulated signal with a predetermined threshold value and thereby outputting a binary signal;

second detection means for comparing a unique word in the multiple sections of receive signal and a known unique word and thereby detecting the second-stage fading distortion of unique word in the multiple sections, comparing data adjacent to unique word in the multiple sections with the binary signal and thereby detecting the fading distortion of adjacent data, outputting the average value of the second-stage fading distortion and the fading distortion of the adjacent data for each of the multiple sections;

second spline interpolation estimation means for calculating a second-stage spline interpolation curve based on the average values in the multiple sections, estimating the second-stage first fading distortion of data in the receive signal from the second-stage spline interpolation curve;

Wiener filter means for estimating the second-stage second fading distortion of data in the receive signal from the average values in the multiple sections; and second demodulation means for demodulating the data in the receive signal based on the second-stage first and second fading distortions of the data.

BRIEF DESCRIPTION OF THE DRAWINGS

The invention will be explained in more detail in conjunction with the appended drawings, wherein.

DESCRIPTION OF THE PREFERRED EMBODIMENTS

A method and a system for demodulating receive signal including pilot signal according to the invention will be explained below.

Figure 4:
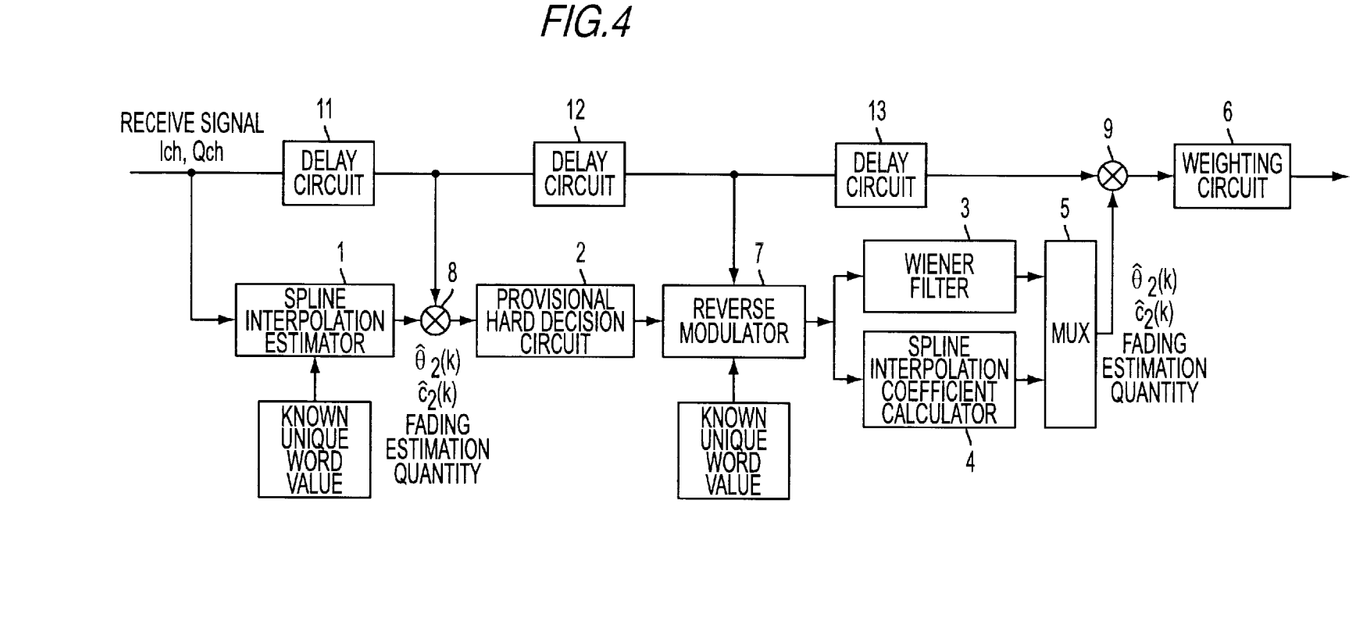
FIG. 4 is a block diagram showing a system for demodulating receive signal including pilot signal in a preferred embodiment according to the invention.

FIG. 4 shows a system for demodulating receive signal including pilot signal in the preferred embodiment according to the invention. This system is an example that this invention is applied to a mobile terminal for satellite communication that a burst signal is communicated. The system is composed of a spline interpolation estimator 1 that compares the unique word of a burst signal as receive signal, described later, with a known unique word, then outputting the fading distortion of unique word for spline interpolation estimation, a demodulator 8 that demodulates the receive signal based on the fading distortion of unique word from the spline interpolation estimator 1, a provisional hard decision circuit 2 that provisionally hard-decides data in the receive signal demodulated by the demodulator 8, outputting 1 and −1, a reverse modulator 7 that detects the fading distortion of data in the receive signal based on 1 and −1 output from the provisional hard decision circuit 2, detecting the fading distortion of unique word in the receive signal based on a known unique word, calculating the fading distortion of expanded unique word from both the fading distortions, a Wiener filter 3 that estimates the fading distortion of intermediate data based on the fading distortion of expanded unique word from the reverse modulator 7, a spline interpolation coefficient calculator 4 that estimates the fading distortion of data at both ends based on the fading distortion of expanded unique word from the reverse modulator 7, a signal multiplexer (MUX) 5 that multiplexes the fading distortion of data from the Wiener filter 3 and the spline interpolation coefficient calculator 4, a demodulator 9 that demodulates the receive signal based on the fading distortion of data from the signal multiplexer 5, and a weighting circuit 6 that when decoding the encoded data of the demodulated data, removes the time variation component of fading distortion so as to reduce the error. Also, among the spline interpolation estimator 1, the provisional hard decision circuit 2, the Wiener filter 3, and the spline interpolation coefficient calculator 4, delay circuits 11, 12 and 13 are disposed in parallel.

Figure 5:
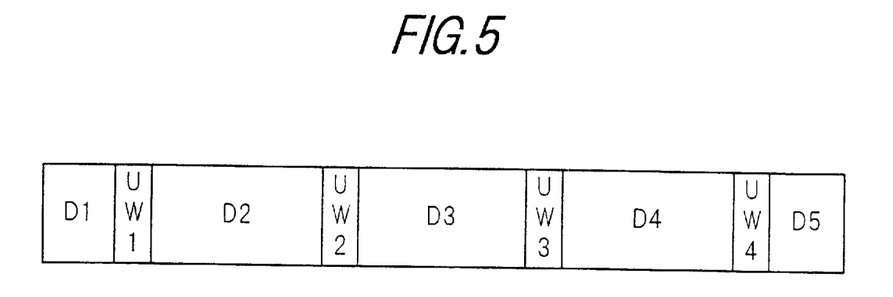
FIG. 5 is an illustration showing a format of receive signal to be modulated by the system in FIG. 4.

FIG. 5 shows a format of burst type transmit/receive signal, and is, for example, composed of 100 to 150 symbols, and unique words UWm (m=1 to 4) as pilot signal are inserted into data D1 to D5 at four parts. Each unique word UWm has a single or multiple symbols according to a target BER, the value of phase demodulation of each symbol is known. This format is transmitted/received by TDMA (time division multiple access), for example, by phase-modulating (BPSK, binary phase shift keying) the carrier wave with phases of 0 and π according to binary data 1 of 1 and −1, each symbol is determined.

Figure 7:
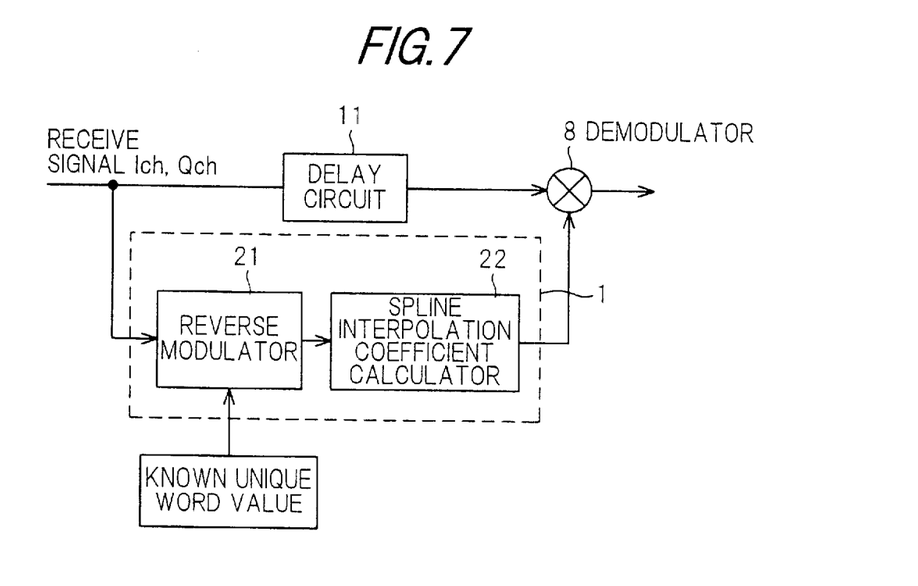
FIG. 7 is a detailed block diagram showing a spline interpolation estimator 1 in FIG. 4.

FIG. 7 shows expanded unique words UWm' whose fading distortion is detected by the reverse modulator 7. Several symbol data in data D1 to D5 adjacent to unique words UW1 to UW4 show in FIG. 5 are shown as D1' to D5' and D2' to D4'. These data D1' to D5' and D2' to D4" input to the reverse modulator 7 through the delay circuits 11, 12 are compared with the value (1 or −1) of corresponding data output from the provisional hard decision circuit 2 to detect the fading distortion. Similarly, unique words UW1 to UW4 are compared with a known unique word by the reverse modulator 7 to detect the fading distortion. The fading distortion of unique words UW1 to UW4 and the fading distortion of data D1' to D5' and D2" to D4" thus detected are averaged at the four sections, and the averages are output as the fading distortion of expanded unique words UW1 to UW4 to the Wiener filter 3 and the spline interpolation coefficient calculator 4.

FIG. 7 shows the spline interpolation estimator 1, the delay circuit 11 and the demodulator 8. The spline interpolation estimator 1 is composed of a reverse modulator 21 that performs the reverse modulation to receive signal with real number part I and imaginary part Q, detecting the fading distortion of unique word UWm by the comparison with a known unique word value, and a spline interpolation coefficient calculator 22 that estimates the fading distortion of data D1 to D5 based on the fading distortion of unique word UWm. Here, the demodulator 8 demodulates data D1 to D5 in the receive signal based on the estimation quantity signal of fading distortion from the spline interpolation coefficient calculator 22.

Figure 8:
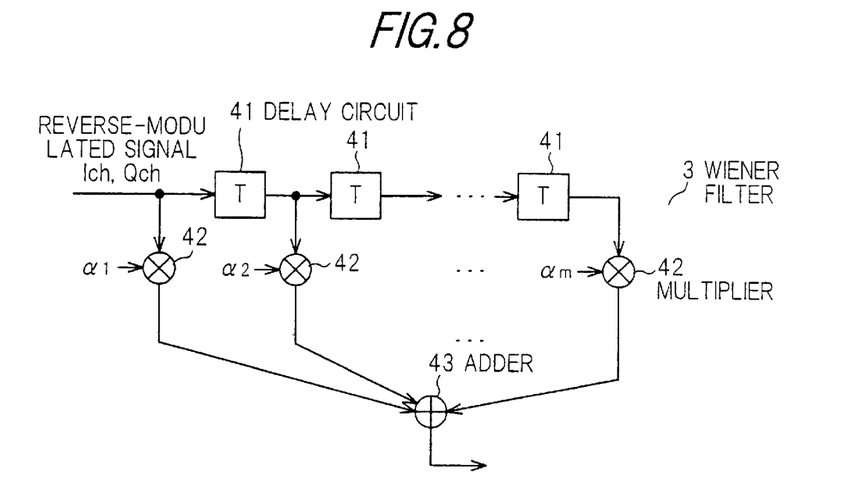
FIG. 8 is a detailed block diagram showing a Wiener filter 3 in FIG. 4.

FIG. 8 shows the Wiener filter 3, and has (m−1) delay circuits 41, multipliers 42 and an adder 43 to add up the multiplication results of the multipliers 42. Here, m corresponds to m=4 of unique words UW1 to UW4 shown in FIG. 5, and indicates the number of multiple sections that unique words UWm are inserted. In the Wiener filter 3, the fading distortions of expanded unique words UWm' detected by the reverse modulator 7 are delayed in the sequence by the delay circuits 41, then the fading distortions of expanded unique words UWm' at multiple sections are input simultaneously to the multipliers 42, multiplied by respective tap coefficients $\alpha 1, \alpha 2, \ldots \alpha m$. The calculation method of the tap coefficients $\alpha 1, \alpha 2, \ldots \alpha m$ is described later, in FIG. 10.

In the demodulation operation, the real number part I and imaginary part Q of receive signal are demodulated separately. In FIG. 4, data D1 to D5 in receive signal are delayed by the delay circuit 11, then demodulated by the demodulator 8 based on the estimation quantity signal of fading distortion from the spline interpolation coefficient calculator 22 of the spline interpolation estimator 1. The demodulated data D1 to D5 are input to the provisional hard decision circuit 2. The provisional hard decision circuit 2 compares the demodulated data D1 to D5 with threshold value "0" to determine them as 1 or −1, outputting the determination results to the reverse modulator 7. The reverse modulator 7 compares D1' to D5' and D2" to D4" in the receive signal from the delay circuit 12 with the corresponding output signal of 1 or −1 of the provisional hard decision circuit 2 and further comparing unique words UW1 to UW4 with a known unique word value to detect the respective fading distortions, thereby detecting the fading distortions of expanded unique words UWm' by calculating the average values described earlier, then outputting them to the Wiener filter 3 and the spline interpolation coefficient calculator 4. The spline interpolation coefficient calculator 4 outputs the fading distortions of data at both ends (D1 and D5 in FIG. 5), and the Wiener filter 3 outputs the fading distortions of intermediate data (D2 to D4 in FIG. 5). MUX 5 multiplexes the output signals of the Wiener filter 3 and the spline interpolation coefficient calculator 4, and the multiplexed signal is output to the demodulator 9.

Also, as described earlier, in the spline interpolation estimator 1, the reverse modulator 21 reverse-modulates the unique words UWm, and then the spline interpolation coefficient calculator 22 calculates the estimation quantity of fading distortion of D1 to D5 based on the fading distortions of unique words UWm from the reverse modulator 21, outputting the results to the demodulator 8.

Figure 9:
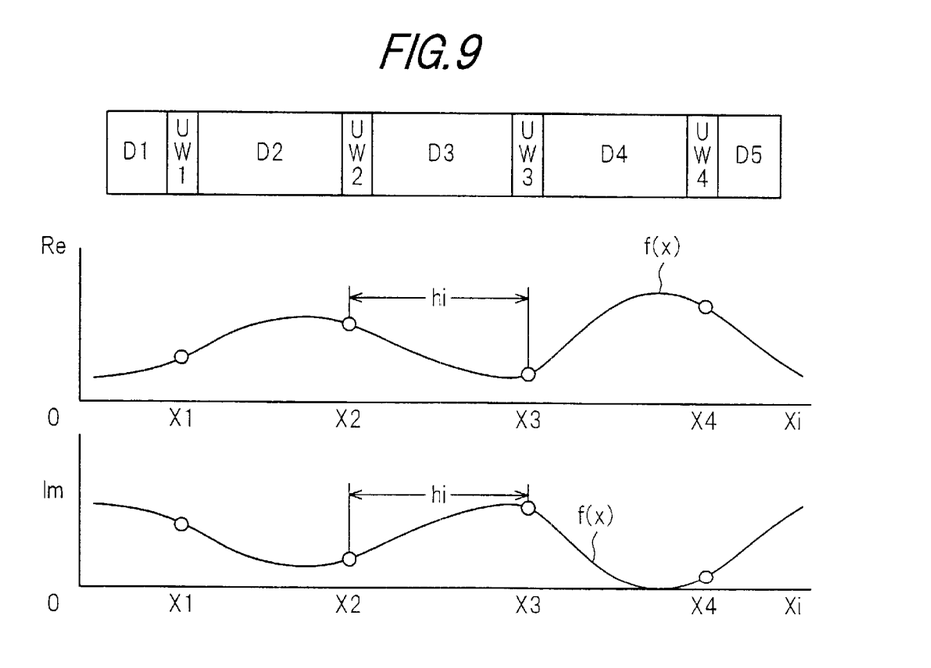
FIG. 9 is illustrations showing spline interpolation curves for real number part and imaginary part that pass through a plot point of fading distortion for each unique word UW of receive signal, FIG. 10 an illustration showing a spline interpolation curve that passes through a plot point of fading distortion for each unique word UW of receive signal.
Figure 10:
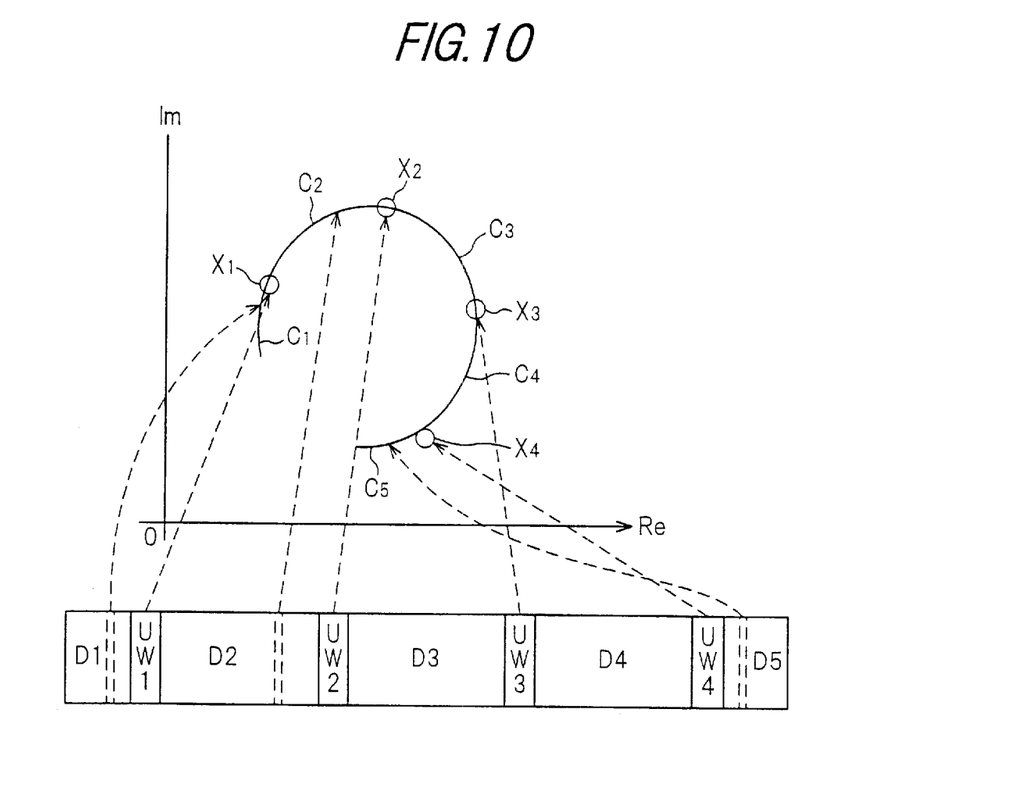

FIGS. 9 and 10 show the process of calculating a spline interpolation curve in the spline interpolation coefficient calculator 22. First, as shown in FIG. 9, the symbol numbers of the unique words UW1 to UW4 are represented as X1 to X4, and the function values corresponding to the respective Xi(i=1, 2, 3 and 4) based on the fading distortions of unique words UWm detected by the reverse modulator 21 are represented as Yi=F(Xi). When each of UWm has multiple symbols, it can be regarded as one point by averaging the multiple symbols. The approximation function to pass the four points is represented as f(x). This function is formed so that it has continuous first-order differential (represented with (') in expression) and second-order differential (represented with (") in expression) in this section and, as described later, satisfies f(x)=F(Xi). The function value F(Xi) is represented with Re for real number part and Im for imaginary part.

For example, in a section {Xi, X(i+1)} with two adjacent end points, if f(x) corresponds to tertiary polynomial expression Pi(x) and hi=X(i+1)−Xi is given, the spline interpolation function Pi(x) is given as:

$$Pi(x)=P''i(Xi)*(X(i+1)-x)^3/6hi+P''i(X(i+1))*(x-Xi)^3/6hi+(Y(i+1)/hi-hi*p''i(Xi+1)/6)*(x-Xi)+(Yi/hi-hi*p''i(Xi)/6)*(X(i+1)-x).$$

where "^3" indicates to cube. This spline interpolation function Pi(x) is, for example, described in "ACOS Software Numerical Calculation Library Manual", 7$^{th}$ Version, issued by NEC Corp., p. 78, 1985. To satisfy f(x)=F(Xi) as described earlier, assuming that tertiary polynomial expressions at both sides of point $X_2$ of real number part Re are $f(x)=a_1x^3+b_1x^2+c_1x+d_1$ and $f(x)=a_2x^3+b_2x^2+c_2x+d_2$, based on the above-described ACOS software, the coefficients $a_1$, $b_1$, $c_1$, $d_1$, $a_2$, $b_2$, $c_2$ and $d_2$ are calculated so that the second-order differential values of both f(x) become equal, thereby determining f(x) for each section Ii. Of course, the spline interpolation function is not limited to tertiary polynomial expressions, and may be quartic or higher. As the order increases, the estimation precision enhances.

FIG. 10 shows the process of calculating the spline interpolation function Pi(x) from the two relations f(x) for real number part Re and imaginary part Im in FIG. 9. By spline interpolation curves C1 to C5 passing through points X1 to X4 that the fading distortions of unique words UWm are plotted, the fading distortions of corresponding data D1 to D5 are estimated. Also, the spline interpolation coefficient calculator 4 estimates the fading distortion of data as the spline interpolation coefficient calculator 22 does.

On the other hand, as shown in FIG. 8, the Wiener filter 3 is a transversal type filter. Here, when the Doppler frequency of fading distortion is represented as $\lambda$, the tap coefficient $\alpha i$ of i-th multiplier 42 to k-th symbol is given by:

$$\alpha i=\sin(x)/x, \ x=2\pi\lambda(i-k).$$

Figure 11:
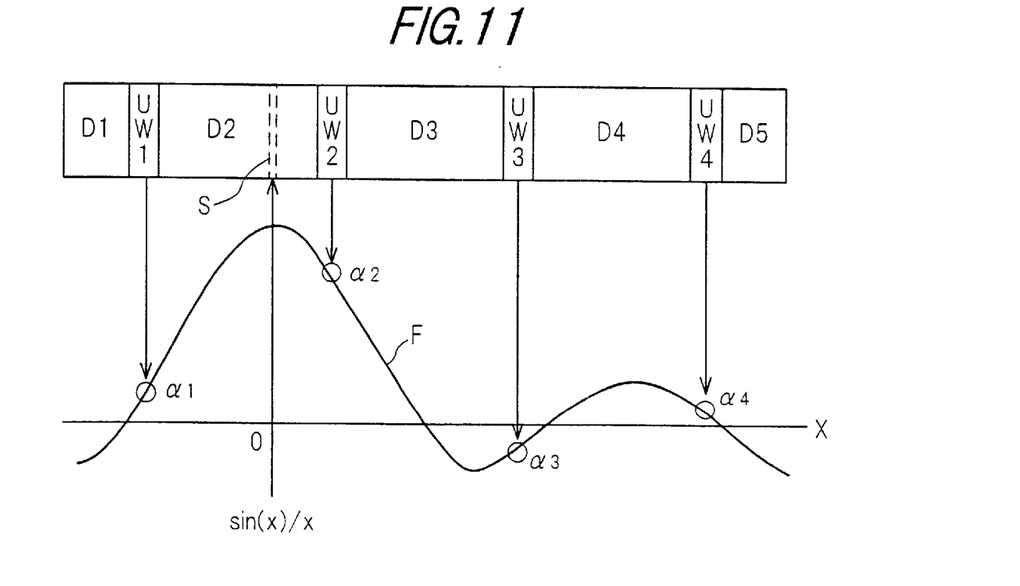
FIG. 11 is an illustration showing a function for calculating a tap coefficient of Wiener filter.

FIG. 11 shows the process of calculating the tap coefficients $\alpha 1$ to $\alpha 4$ of the Wiener filter 3 to symbol S of data D2 based on curve F of sin(x)/x. Here, when the position of symbol S to calculate the tap coefficient is 0, the lateral axis x indicates a distance according to the symbol number from the position. Aligning the maximum value of the curve F to the position of 0, the values on the curve F corresponding to the positions of unique words UWm on the x axis are the tap coefficients, and are given to the multipliers 42 of the Wiener filter 3.

As described earlier, the reverse modulator 7 detects the fading distortion of expanded unique word UWm', outputting it to the Wiener filter 3 and the spline interpolation coefficient calculator 4. The spline interpolation coefficient calculator 4 detects the fading distortions of data D1 and D5 and then outputs them to the demodulator 9, and the Wiener filter 3 detects the fading distortions of data D2, D3 and D4 and then outputs them to the demodulator 9.

The demodulator 9 demodulates the receive signal based on the fading distortions of data D1 and D5 input from the spline interpolation coefficient calculator 4 and the fading distortions of data D2, D3 and D4 input from the Wiener filter 3, then outputting it to the weighting circuit 6.

The weighting circuit 6 locates before a decoder (not shown) that decodes encoded data into decoded data of 1 or −1 based on Viterbi decoding algorithm. Provided that the estimation quantity of fading distortion to k-th symbol is c(k), the weighting circuit 6 removes the time variation component of fading distortion by multiplying the decoded signal by |c(k)|. Thereby, the error in decoding the encoded data can be minimized.

The above-described estimation of fading distortion of data will be further in detail explained. Here, if receive signal and transmit signal to k-th symbol are represented as r(k) and s(k), the receive signal r(k) is represented, using fading distortion f(k) and noise component n(k), by:

$$r(k)=f(k)*s(k)+n(k).$$

First, for unique words UWm, since s(k) is known on the reception side, the fading distortion of UWm is calculated from the ratio of receive signal r(k) and transmit signal s(k) that the demodulation component is removed by reverse-modulating by the reverse modulator 21. Namely, r(k)/s(k)=f(k)+n(k)/s(k) is calculated. Here, the fading distortion r(k)/s(k) includes n(k)/s(k) as a noise. However, when each unique word UWm has multiple symbols, by averaging the noise among the multiple symbols, the noise is in accordance with gaussian distribution with an average of 0. Therefore, the affect can be compressed, preventing the detection precision from reducing. When the unique word UWm has multiple symbols, its average is calculated, output to the spline interpolation coefficient calculator 22. The spline interpolation coefficient calculator 22, as shown in FIGS. 9 and 10, calculates the estimation quantity c1(k) of fading distortion of data D1 to D5 based on the fading distortion of unique words UWm, then outputting it to the demodulator 8. Another output θ1(k) is given by Arctan{Im(c1(k))/Re(c1(k))}. The demodulator 8 divides the receive signal r(k) by the estimation quantity c1(k) of fading distortion, thereby input a(k) to the provisional hard decision circuit 2 is calculated by:

$$a(k)=r(k)/c1(k) =f(k)*s(k)/c1(k)+n(k)/c1(k).$$

The output a'(k) from the provisional hard decision circuit 2 is given as 1 or −1, comparing with threshold value "0", by:

$$a'(k)=[1:Re\{a(k)\}>0, -1:Re\{a(k)\}<0].$$

On the other hand, in the Wiener filter 3, for the intermediate part (D2 to D4 in FIG. 5) of burst signal, the estimation value c2(k) of k-th symbol is calculated from tap coefficient αi by:

$$c2(k)=\Sigma\alpha i*r(i)/a'(i), i=1\ to\ N,$$

where N is the symbol number of burst signal.

Accordingly, the output θ2(k) is given by:

$$\theta2(k)=Arctan\{Im(c2(k))/Re(c2(k))\}.$$

Next, for both ends (D1, D5 in FIG. 5) of burst signal, the estimation of fading distortion in the spline interpolation coefficient calculator 4 will be explained.

Figure 6:
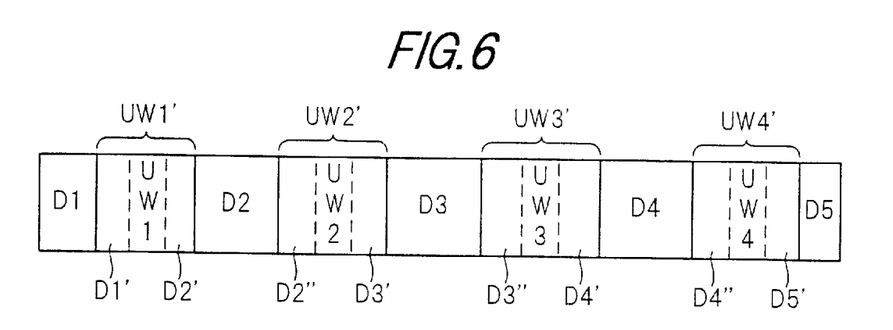
FIG. 6 is an illustration showing a format of burst signal with expanded unique word.

In FIG. 6, the original unique word UWm is expanded into unique word UWm' by regarding the symbols of data parts at both sides as unique words. For the original unique word UWm, the fading distortion is calculated by r(k)/a(k). For the remaining part of the expanded unique word UWm', the fading distortion is calculated by r(k)/a'(k). These calculated values are averaged, regarding the expanded unique word UWm' as one point, plotting as shown in FIGS. 9 and 10, calculating the estimation quantity c2(k) of fading distortion of data D1 and D5.

Thus, the output value is given similarly by:

$$\theta2(k)=Arctan\{Im(c2(k))/Re(c2(k))\}.$$

From these results, the receiving data is demodulated by the demodulator 8, as $r(k)*exp\{-j\ \theta2(k)\}$. Further, the output signal of the weighting circuit 6 is given as $r(k)*|c(k)|*exp\{-j\theta2(k)\}$.

Figure 12:
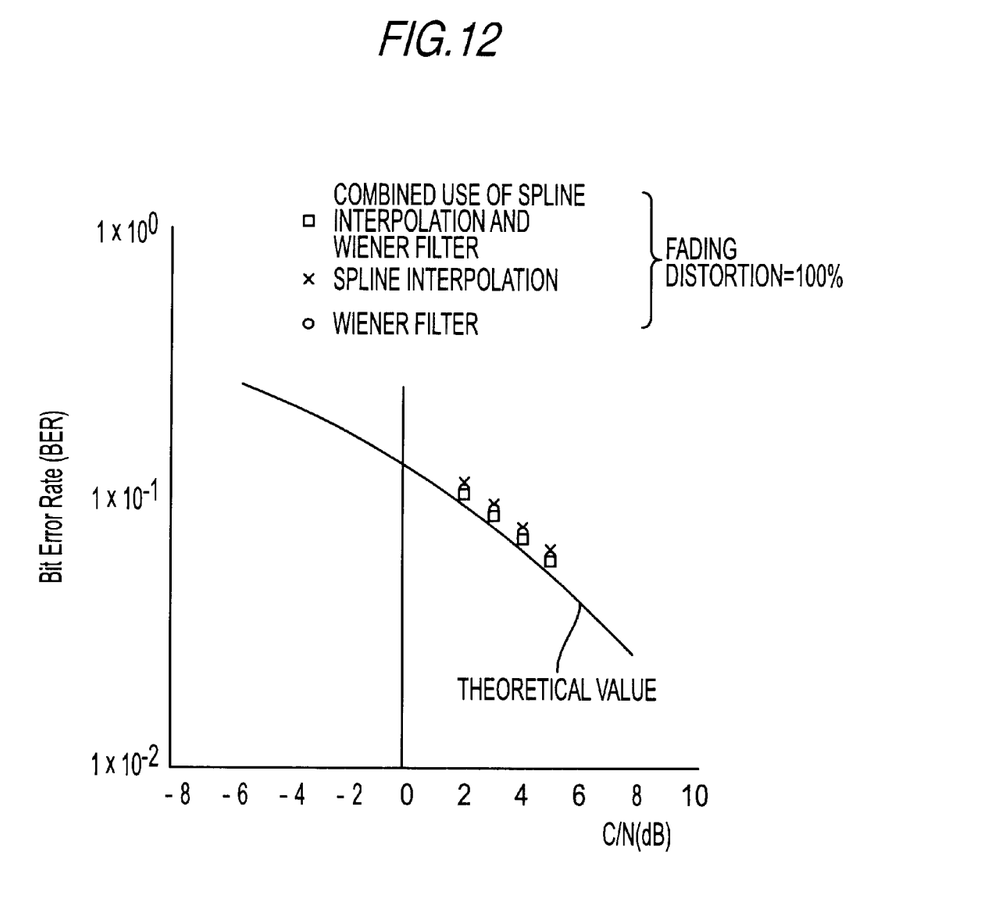
FIG. 12 is a graph showing a BER characteristic in the invention.

FIG. 12 shows a BER characteristic found by the inventor. Mark □ shows the result that the fading distortions of data D1 and D5 are estimated by the spline interpolation and the fading distortions of data D2, D3 and D4 are estimated by the Wiener filter, mark X shows the result that the fading distortion of data is estimated only by the spline interpolation, and mark ○ shows the result that the fading distortion of data is estimated only by the Wiener filter. It is proved that the method of demodulating both ends of data by the estimation quantity of spline interpolation and demodulating the intermediate parts of data by the estimation quantity of Wiener filter gives BER closest to the theoretical value.

As described above, in the embodiment of the invention, receive signal (encoded data) with real number part I and imaginary part Q received through satellite is converted from analogue value to digital value, reverse-modulating unique word UWm inserted into the receive signal at given intervals, comparing the reverse-modulated UWm and a known unique word to calculate the fading distortion of unique word UWm, estimating the fading distortion of data from the spline interpolation curve calculated based on the fading distortion of unique word UWm, demodulating the receive signal based on the fading distortion of data, binarizing the demodulated by provisionally hard-deciding based on a given threshold value, reverse-modulating the receive signal based on the binarized result to detect the fading distortion of data adjacent to unique word UWm. The fading distortion of expanded unique word UWm' is calculated from the fading distortion of unique word UWm and the fading distortion of adjacent data. The fading distortion of expanded unique word UWm' thus obtained is supplied to the Wiener filter and the spline interpolation coefficient calculator. The Wiener filter estimates the fading distortion of data based on the fading distortion and tap coefficient of expanded unique word UWm'. On the other hand, the spline interpolation coefficient calculator estimates the fading distortion of data from the spline interpolation curve defined based on the fading distortion of expanded unique word UWm'. The receive signal is, for example, a burst signal phase-modulated by BPSK, which is communicated using TDMA. The intermediate parts of burst signal are demodulated based on the fading distortion of data estimated by the Wiener filter, and both ends of burst signal are demodulated based on the fading distortion of data estimated by the spline interpolation coefficient calculator.

In another embodiment, the phase modulation may be QPSK to modulate carrier wave with quaternary value, the communication manner may be CDMA (code division multiple access). CDMA is the manner that multiple signals use a common frequency while having specific encrypted codes. By a signal format that pilot signals are inserted intermittently, the modulation method and system of this invention can be applied. Also, signal to be communicated is not always of burst type, and may be continuous wave. Further, the Wiener filter and spline interpolation estimator may be used independently, and even when used in combination, the roles for intermediate part and both sides is not limited to those described above.

ADVANTAGES OF THE INVENTION

As described above, in the method and system for demodulating receive signal including pilot signal according to the invention, the spline interpolation curve for estimating the fading distortion of data is calculated based on the fading distortion of unique word. Therefore, a low BER can be obtained without increasing the amount of operation. Especially, the spline interpolation estimator has a high estimation precision of fading distortion at both ends of burst signal and the Wiener filter has a high estimation precision of fading distortion at intermediate part of burst signal. Therefore, by combining the Wiener filter and the spline interpolation estimator as the above embodiment does, a high-quality mobile satellite communication can be performed even under the conditions with fast fading and low C/N.

Also, by using the Wiener filter and the spline interpolation estimator with a relatively small amount of operation, a desired characteristic can be obtained without a large-scale operation required for matrix-like method. Further, by calculating the fading distortion of expanded unique word from the fading distortion of unique word and the fading distortion of adjacent data, the fading distortion of data can be estimated at a high precision.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. A method for demodulating a receive signal, the receive signal including a unique word as a pilot signal, wherein the receive signal is demodulated to estimate the fading distortion of data by detecting the fading distortion of the unique word inserted into multiple sections of the receive signal, comprising the steps of:

comparing the unique word in said multiple sections of the receive signal and a known unique word and thereby detecting the fading distortion of the unique word in said multiple sections;

calculating a spline interpolation curve based on the fading distortion of the unique word in said multiple sections;

estimating the fading distortion of data in the receive signal from said spline interpolation curve; and demodulating said data in the receive signal based on the fading distortion of the data.

2. A method for demodulating a receive signal according to claim 1, wherein:

said step of detecting the fading distortion of the unique word in said multiple sections comprises the steps of:
   receiving a burst signal with a predetermined symbol number as said receive signal;
   extracting a unique word in said multiple sections from the burst signal; and
   detecting the fading distortion of the unique word in said multiple sections extracted at said extracting step.

3. A method for demodulating a receive signal according to claim 2, wherein:

said step of receiving a burst signal with a predetermined symbol number comprises the step of:
   receiving a burst signal with the predetermined symbol number phase-modulated by BPSK (binary phase shift keying) in a TDMA (time division multiple access) manner.

4. A method for demodulating a receive signal according to claim 2, wherein:

said step of receiving a burst signal with a predetermined symbol number comprises the step of:
   receiving a burst signal with the predetermined symbol number phase-modulated by BPSK in a CDMA (code division multiple access) manner.

5. A method for demodulating a receive signal according to claim 2, wherein:

said step of receiving a burst signal with a predetermined symbol number comprises the step of:
   receiving a burst signal with the predetermined symbol number phase-modulated by QPSK (quadrature phase shift keying) in a TDMA manner.

6. A method for demodulating a receive signal according to claim 2, wherein:

said step of receiving a burst signal with a predetermined symbol number comprises the step of:
   receiving a burst signal with the predetermined symbol number phase-modulated by QPSK in a CDMA manner.

7. A method for demodulating a receive signal according to claim 1, wherein: said step of calculating a spline interpolation curve is performed so that: when the symbol number of unique word in said multiple sections is represented as $Xi (i=1, 2, 3$ and $4)$, the function value corresponding to the respective $Xi$ is represented as $Yi=F(Xi)$, the approximation function to pass said multiple unique words is represented as $f(x)$, which has continuous first-order differential (represented with (') in expression below) and second-order differential (represented with ('') in expression below) and satisfies $f(x)=F(Xi)$, in a section $Ii=\{Xi, X(i+1)\}$ with two adjacent end points, $f(x)$ corresponds to tertiary polynomial expression $Pi(x)$ and $hi=X(i+1)-Xi$ is given, said spline interpolation curve is calculated as $Pi(x)$ given by:

$$Pi(x)=P''i(Xi)*(X(i+1)-x)^3/6hi+P''i(X(i+1))*(x-Xi)^3/6hi+(Y(i+1)/hi-hi*P''i(Xi+1)/6)*(x-Xi)+(Yi/hi-hi*P''i(Xi)/6)*(X(i+1)-x)$$

where "^3" indicates to cube.

8. A method for demodulating a receive signal according to claim 1, wherein:

said step of calculating a spline interpolation curve is to calculate said spline interpolation curve based on a tertiary or higher polynomial expression.

9. A method for demodulating a receive signal according to claim 1, further comprising the steps of:

comparing the demodulated data with a threshold value to determine an output value; and
   sending the output value to a reverse modulator.

10. A method for demodulating a receive signal, the receive signal including a unique word as a pilot signal, wherein the receive signal is demodulated to estimate the fading distortion of data by detecting the fading distortion of the unique word inserted into multiple sections of the receive signal, comprising the steps of:

comparing the unique word in said multiple sections of the receive signal and a known unique word and thereby detecting the fading distortion of the unique word in said multiple sections;

calculating a spline interpolation curve based on the fading distortion of the unique word in said multiple sections;

estimating the first fading distortion of data in the receive signal from said spline interpolation curve;

estimating the second fading distortion of data in the receive signal by inputting the fading distortion of the unique word in said multiple sections to a Wiener filter; and demodulating said data in the receive signal based on said first and second fading distortions of the data.

11. A method for demodulating a receive signal according to claim 10, wherein:

said step of detecting the fading distortion of the unique word in said multiple sections comprises the steps of: receiving a burst signal with a predetermined symbol number as said receive signal; extracting a unique word in said multiple sections from the burst signal; and detecting the fading distortion of the unique word in said multiple sections extracted at said extracting step;

said step of estimating the first fading distortion of data in the receive signal includes the step of estimating the fading distortion at both ends of the burst signal; and said step of estimating the second fading distortion of data in the receive signal includes the step of estimating the fading distortion at intermediate parts of the signal.

12. A method for demodulating a receive signal, the receive signal including a unique word as a pilot signal, wherein the receive signal is demodulated to estimate the fading distortion of data by detecting the fading distortion of the unique word inserted into multiple sections of the receive signal, comprising the steps of:

comparing the unique word in said multiple sections of the receive signal and a known unique word and thereby detecting the fading distortion of the unique word in said multiple sections;

calculating a first-stage spline interpolation curve based on said first-stage fading distortion of the unique word in said multiple sections;

estimating the first-stage fading distortion of data in the receive signal from said first-stage spline interpolation curve;

demodulating said receive signal based on said first-stage fading distortion of data in the receive signal and then outputting a demodulated signal;

comparing said demodulated signal with a predetermined threshold value and thereby outputting a binary signal;

comparing the unique words in said multiple sections of the receive signal and a known unique word and thereby detecting the second-stage fading distortion of the unique word in said multiple sections;

comparing data adjacent to the unique word in said multiple sections with said binary signal and thereby detecting the fading distortion of adjacent data;

calculating a second-stage spline interpolation curve based on the average of said second-stage fading distortion of unique word in said multiple sections and said fading distortion of adjacent data;

estimating the second-stage first fading distortion of data in the receive signal from said second-stage spline interpolation curve;

estimating the second-stage second fading distortion of data in the receive signal by inputting said average of said second-stage fading distortion of unique words in said multiple sections and said fading distortion of adjacent data to a Wiener filter; and demodulating said data in the receive signal based on said second-stage first and second fading distortions of the data.

13. A method for demodulating a receive signal according to claim 12, wherein:

said step of detecting the first-stage fading distortion of unique word in said multiple sections comprises the steps of: receiving a burst signal with a predetermined symbol number as said receive signal; extracting a unique word in said multiple sections from the burst signal; and detecting the first-stage fading distortion of unique words in said multiple sections extracted at said extracting step;

said step of estimating said second-stage first fading distortion of data in the receive signal includes the step of estimating the fading distortion of data at both ends of said burst signal; and said step of estimating said second-stage fading distortion of data in the receive signal includes the step of estimating the fading distortion of data at intermediate parts of said signal.

14. A system for demodulating a receive signal, the receive signal including a unique word as a pilot signal, wherein the receive signal is demodulated to estimate the fading distortion of data by detecting the fading distortion of the unique word inserted into multiple sections of the receive signal, comprising the steps of:

detection means for comparing the unique word in said multiple sections of the receive signal and a known unique word and thereby detecting the fading distortion of the unique word in said multiple sections;

spline interpolation estimation means for calculating a spline interpolation curve based on the fading distortion of the unique word in said multiple sections, and estimating the fading distortion of data in the receive signal from said spline interpolation curve; and demodulation means for demodulating said data in the receive signal based on the fading distortion of the data.

15. A system for demodulating a receive signal according to claim 14, wherein:

said detection means compares a unique word in said multiple sections inserted into a burst signal with a predetermined symbol number as said receive signal with a known unique word.

16. A system for demodulating a receive signal according to claim 15, wherein:

said burst signal with a predetermined symbol number as said receive signal is phase-modulated by BPSK (binary phase shift keying) and received in a TDMA (time division multiple access) manner.

17. A system for-demodulating a receive signal according to claim 15, wherein:

said burst signal with a predetermined symbol number as said receive signal is phase-modulated by BPSK and received in a CDMA (code division multiple access) manner.

18. A system for demodulating a receive signal according to claim 15, wherein:

said burst signal with a predetermined symbol number as said receive signal is phase-modulated by QPSK (quadrature phase shift keying) and received in a TDMA manner.

19. A system for demodulating a receive signal according to claim 15, wherein:

said burst signal with a predetermined symbol number as said receive signal is phase-modulated by QPSK and received in a CDMA manner.

20. A system for demodulating a receive signal according to claim 14, wherein: said spline interpolation estimation means performs such a calculation that: when the symbol number of unique word in said multiple sections is represented as $Xi(i=1, 2, 3$ and $4)$, the function value corresponding to the respective $Xi$ is represented as $Yi=F(Xi)$, the approximation function to pass said multiple unique words is represented as $f(x)$, which has continuous first-order differential (represented with (') in expression below) and second-order differential (represented with (") in expression below) and satisfies $f(x)=F(Xi)$, in a section $Ii=\{Xi, X(i+1)\}$ with two adjacent end points, $f(x)$ corresponds to tertiary polynomial expression $Pi(x)$ and $hi=X(i+1)-Xi$ is given, said spline interpolation curve is calculated as $Pi(x)$ given by:

$$Pi(x)=P''i(Xi)*(X(i+1)-x)^3/6hi+P''i\ (X(i+1))*(x-Xi)^3/6hi+(Y(i+1)/hi-hi*P\ ''i(Xi+1)/6)*(x-Xi)+(Yi/hi-hi*P''i(Xi)/6)*(X(i+1)-x)$$

where "^3" indicates to cube.

21. A system for demodulating a receive signal according to claim 14, wherein:

said spline interpolation estimation means calculates said spline interpolation curve based on a tertiary or higher polynomial expression.

22. A system for demodulating a receive signal according to claim 14, further comprising:

comparing means for comparing the demodulated data with a threshold value to determine an output value; and sending means for sending the output value to a reverse modulator.

23. A system for demodulating a receive signal, the receive signal including a unique word as a pilot signal, wherein the receive signal is demodulated to estimate the fading distortion of data by detecting the fading distortion of the unique word inserted into multiple sections of the receive signal, comprising the steps of:

detection means for comparing the unique word in said multiple sections of the receive signal and a known unique word and thereby detecting the fading distortion of the unique word in said multiple sections;

spline interpolation estimation means for calculating a spline interpolation curve based on the fading distortion of the unique word in said multiple sections, and estimating the first fading distortion of data in the receive signal from said spline interpolation curve;

Wiener filter means for estimating the second fading distortion of data in the receive signal from the fading distortion of the unique word in said multiple sections; and demodulation means for demodulating said data in the receive signal based on said first and second the fading distortions of the data.

24. A system for demodulating a receive signal according to claim 23, wherein:

said detection means comprises a receiving block to receive a burst signal with a predetermined symbol number as said receive signal; an extracting block to extract a unique word in said multiple sections from the burst signal; and detecting the fading distortion of the unique word in said multiple sections extracted at said extracting block;

said spline interpolation estimation means estimates the first fading distortion of data at both ends of the burst signal; and said Wiener filter means estimates the fading distortion of data at intermediate parts of the burst signal.

25. A system for demodulating a receive signal according to claim 23, wherein:

said Wiener filter means comprises multiple delay circuits that delay the fading distortion of the unique word in said multiple sections by the number of times corresponding to sequences of input; multiple multipliers, each of which is disposed on a branch lead branched from an input lead for each of said multiple delay circuits, that multiply the fading distortion of the unique word in said multiple sections by a predetermined tap coefficient; and an adder that adds the multiplication results of said multiple multipliers and then outputs the estimation quantity of fading distortion of data in said receive signal.

26. A system for demodulating a receive signal according to claim 25, wherein:

said multiple multipliers set a function that, when the position difference (k-i) between k-th symbol and i-th symbol in the burst signal with the predetermined symbol number is defined as a distance between the k-th symbol and i-th symbol, gives a functional value according to the distance between a corresponding unique word of the unique words in said multiple sections and target data in said receive signal that the fading distortion is to be estimated, and uses the functional value determined according to-the distance as said tap coefficient.

27. A system for demodulating a receive signal according to claim 26, wherein:

said multiple multipliers set, as said function, $\sin(x)/x$ where x indicates the distance from an origin that is defined by aligning the maximum functional value of said function to the position of said target data.

28. A system for demodulating a receive signal, the receive signal including a unique word as a pilot signal, wherein the receive signal is demodulated to estimate the fading distortion of data by detecting the fading distortion of the unique word inserted into multiple sections of the receive signal, comprising:

first detection means for comparing the unique word in said multiple sections of the receive and a known unique word and thereby detecting the first-stage fading distortion of the unique word in said multiple section;

spline interpolation estimation means for calculating a first-stage spline interpolation curve based on said first-stage fading distortion of the unique word in said multiple sections, estimating the first-stage fading distortion of data in the receive signal from said first-stage spline interpolation curve;

first demodulation means for demodulating said receive signal based on said first-stage fading distortion of data in the receive signal and then outputting a demodulated signal;

decision means for comparing said demodulated signal with a predetermined threshold value and thereby outputting a binary signal;

second detection means for comparing the unique word in said multiple sections of the receive signal and a know unique word and thereby detecting the second-stage fading distortion of the unique word in said multiple sections, comparing data adjacent to the unique word in said multiple sections with said binary signal and thereby detecting the fading distortion of adjacent data, outputting the average value of said second-stage fading distortion and the fading distortion of said adjacent data for each of said multiple sections;

second spline interpolation estimation means for calculating a second-stage spline interpolation curve based on the average values in said multiple section, estimating the second-stage first fading distortion of data in the receive signal from said second-stage spline interpolation curve;

Wiener filter means for estimating the second-stage second fading distortion of data in the receive signal from the average values in said multiple sections; and second demodulation means for demodulating said data in the receive signal based on said second-stage first and second fading distortions of the data.

29. A system for demodulating a receive signal according to claim 28, wherein:

said first detection means comprises a receiving block to receive a burst signal with a predetermined symbol number as said receive signal, an extracting block to extract a unique word in said multiple sections from the burst signal, and a detecting block to detect the first-stage fading distortion of the unique word in said multiple sections extracted at said extracting block;

said second spline interpolation estimation means includes a spline interpolation coefficient calculator that estimates the fading distortion of data at both ends of said burst signal as said second-stage first fading distortion; and said Wiener filter means includes a Wiener filter that estimates the fading distortion of data at intermediate parts except said both ends of said burst signal as said second-stage second fading distortion.

* * * * *